US009378750B2

(12) United States Patent
Son et al.

(10) Patent No.: US 9,378,750 B2
(45) Date of Patent: Jun. 28, 2016

(54) APPARATUS AND METHOD OF REPRODUCING AUDIO DATA USING LOW POWER

(75) Inventors: Chang Yong Son, Gunpo-si (KR); Kang Eun Lee, Hwaseong-si (KR); Do Hyung Kim, Hwaseong-si (KR); Shi Hwa Lee, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 513 days.

(21) Appl. No.: 13/584,170

(22) Filed: Aug. 13, 2012

(65) Prior Publication Data

US 2013/0103392 A1 Apr. 25, 2013

(30) Foreign Application Priority Data

Oct. 25, 2011 (KR) ........................ 10-2011-0109555

(51) Int. Cl.
*G10L 19/00* (2013.01)
*G10L 19/16* (2013.01)
*G06F 17/00* (2006.01)

(52) U.S. Cl.
CPC ..................................... *G10L 19/16* (2013.01)

(58) Field of Classification Search
CPC ........ G10L 19/00; G10L 19/16; G11B 20/10; G06F 17/00; G06L 21/00
USPC ............... 704/201, 203, 211, 500; 381/22, 77
See application file for complete search history.

(56) References Cited

U.S. PATENT DOCUMENTS 8,327,158 B2 * 12/2012 Titiano .................. G06F 1/3203 713/300
2007/0109292 A1 * 5/2007 Dahan .................... G09G 5/363 345/211
2008/0082319 A1 * 4/2008 Sebestian .............. G10L 19/167 704/200.1
2008/0307240 A1 * 12/2008 Dahan ........................ G06F 1/06 713/320
2009/0281797 A1 * 11/2009 Zopf ..................... G10L 19/005 704/207
2010/0030928 A1 * 2/2010 Conroy ................. G06F 1/3203 710/23
2011/0039508 A1 * 2/2011 Lindahl ................. G06F 1/3203 455/230
2011/0066264 A1 * 3/2011 Cho ................ G11B 20/10527 700/94
2011/0305343 A1 * 12/2011 Lee ......................... G06F 3/162 381/22
2013/0110521 A1 * 5/2013 Hwang ............... H04W 52/028 704/500

FOREIGN PATENT DOCUMENTS

JP 2004-158065 6/2004
KR 10-2004-0015669 2/2004
KR 10-2004-0036841 5/2004
KR 10-2007-0028713 3/2007
KR 10-2009-0101386 9/2009
KR 10-2010-0089542 8/2010
KR 10-2011-0030080 3/2011
KR 1020110030080 * 3/2011 ............. G11B 20/10

* cited by examiner

*Primary Examiner* — Pierre-Louis Desir
*Assistant Examiner* — Seong Ah A Shin
(74) *Attorney, Agent, or Firm* — Staas & Halsey LLP

(57) ABSTRACT

A method and apparatus for reproducing audio data using low power are provided. The apparatus may reproduce the audio data by determining a power mode based on a memory resource of an internal memory, and an amount of a memory required for reproducing the audio data, controlling a power based on the determined power mode, and decoding the audio data.

20 Claims, 6 Drawing Sheets

100

APPARATUS AND METHOD OF REPRODUCING AUDIO DATA USING LOW POWER

CROSS-REFERENCE TO RELATED APPLICATIONS

This application claims the priority benefit of Korean Patent Application No. 10-2011-0109555, filed on Oct. 25, 2011, in the Korean Intellectual Property Office, the disclosure of which is incorporated herein by reference.

BACKGROUND

1. Field

One or more example embodiments relate to an apparatus and method of restoring and reproducing an audio signal in an output apparatus of an information technology (IT) consumer device.

2. Description of the Related Art

Generally, a sound information system, for example, a smart phone, a mobile phone, a Moving Picture Experts Group (MPEG) Audio Layer 3 (MP3) player, a home theater, a computer, a tablet personal computer (PC), and a Portable Multimedia Player (PMP), restores and reproduces an audio signal using an application processor (AP) in a form of System On Chip (SoC).

Recently, an operation clock rate or an operation frequency required for operating multimedia such as image data or audio data has trended towards increasing. With an increase in an operation clock speed, high-efficiency APs are being mounted in information technology (IT) consumer devices. Here, the AP may be configured as a SoC to play a role of a Central Process Unit (CPU) in the IP consumer devices. In this instance, the IT consumer devices may include a smart phone, a mobile phone, a tablet PC, a PMP, and the like.

The IT consumer device may reproduce audio data and high-resolution images by increasing an operation rate of the AP. Such an increase, however, may lead to an increase in an amount of expended power.

In particular, when the IT consumer device is portable, expenditure of a battery may be accelerated resulting in shorter battery life since an amount of power expended in restoration of compressed audio or image data may be increased.

Accordingly, there is a desire for technology to reduce an amount of power expended in the reproduction of audio or image data while still improving an operation rate. That is, there is a need for a technology that consumes low power for restoring and reproducing audio or image data.

SUMMARY

The foregoing and/or other aspects are achieved by providing an apparatus for reproducing audio data, the apparatus including a top system to transfer audio data, an audio input buffer to store the audio data received from the top system, an audio decoding unit to decode the audio data, an audio output buffer to store the decoded audio data, and a power controlling unit to control a power supplied to the top system based on at least one of an amount of audio data stored in the audio input buffer that is consumed, and an amount of audio data stored in the audio output buffer that is consumed.

The power controlling unit may increase an amount of time required for powering down the top system when at least one of a size of the audio output buffer, and a speed of an operation clock increases.

The power controlling unit may power down the top system by interrupting the power supplied to the top system based on a result of comparing the amount of audio data stored in the audio output buffer that is consumed to a power-down reference amount time.

The power controlling unit may wake up the top system by re-supplying the power to the top system based on a result of comparing the amount of audio data stored in the audio output buffer that is consumed to a wake-up reference amount.

The power controlling unit may wake up the top system by re-supplying the power to the top system based on a result of comparing the amount of audio data stored in the audio input buffer that is consumed to a reference amount of an input buffer.

The top system may include a central processing unit to determine audio decoding information corresponding to the audio data, and a memory to store at least one of the audio data, sound effect information, and the audio decoding information.

The power controlling unit may wake up the memory by re-supplying the power to the memory based on a result of comparing the amount of audio data stored in the audio output buffer that is consumed to a wake-up reference amount.

The power controlling unit may wake up the central processing unit by re-supplying the power to the central processing unit based on a result of comparing the amount of audio data stored in the audio output buffer that is consumed to a wake-up reference amount.

The central processing unit may wake up the memory, and may be powered down again.

The apparatus may further include an audio converting unit to convert the decoded audio data to an audio output signal. Here, the power controlling unit may be disposed between the audio output buffer and the audio converting unit.

The foregoing and/or other aspects are achieved by providing a method of reproducing audio data, the method including storing, in an audio input buffer, audio data received from a top system, decoding the audio data, storing the decoded audio data in an audio output buffer, and controlling a power supplied to the top system based on at least one of an amount of audio data stored in the audio input buffer that is consumed, and the amount of audio data stored in the audio output buffer that is consumed.

The controlling may include increasing an amount of time required for powering down the top system when at least one of a size of the audio output buffer and a speed of an operation clock increases.

The controlling may include powering down the top system by interrupting the power supplied to the top system based on a result of comparing the amount of audio data stored in the audio output buffer that is consumed to a power-down reference amount.

The controlling may include waking up the top system by re-supplying the power to the top system based on a result of comparing the amount of audio data stored in the audio output buffer that is consumed to a wake-up reference amount.

The controlling may include waking up the top system by re-supplying the power to the top system based on a result of comparing the amount of audio data stored in the audio input buffer that is consumed to a reference amount of input buffer.

The method may further include converting the decoded audio data to an audio output signal.

The foregoing and/or other aspects are achieved by providing an apparatus for reproducing audio data, the apparatus including a top system to transfer audio data, and a mode determining unit to determine a power mode of the audio data based on a memory resource, and an amount of a memory required for reproducing the audio data.

The mode determining unit may adjust a size of an audio input buffer and a size of an audio output buffer based on the determined power mode.

The mode determining unit may adjust a speed of an operation clock to be increased or decreased based on the determined power mode.

The apparatus may further include an audio input buffer to store the audio data when the determined power mode corresponds to a first mode, a power controlling unit to control a power supplied to the top system based on the amount of audio data stored in the audio input buffer that is consumed, an audio decoding unit to decode the audio data, and an audio output buffer to store the decoded audio data.

The power controlling unit may increase an amount of time required for powering down the top system in proportion to a size of the audio input buffer.

The controlling unit may wake up the top system by re-supplying the power to the top system based on a result of comparing the amount of audio data stored in the audio input buffer that is consumed to a reference amount of input buffer.

The apparatus may further include an audio input buffer to store the audio data when the determined power mode corresponds to a second mode, an audio decoding unit to decode the audio data, an audio output buffer to store the decoded audio data, and a power controlling unit to control a power supplied to the top system based on at least one of an amount of audio data stored in the audio input buffer that is consumed and the amount of audio data stored in the audio output buffer that is consumed.

The power controlling unit may increase an amount of time required for powering down the top system when at least one of a size of the audio output buffer and a speed of an operation clock increases.

The power controlling unit may power down the top system by interrupting the power supplied to the top system based on a result of comparing the amount of audio data stored in the audio output buffer that is consumed to a power-down reference amount.

The power controlling unit may wake up the top system by re-supplying the power to the top system based on a result of comparing the amount of audio data stored in the audio output buffer that is consumed to a wake-up reference amount.

The power controlling unit may wake up the top system by re-supplying the power to the top system based on a result of comparing the amount of the amount of audio data stored in the audio input buffer that is consumed to a reference amount of input buffer.

A speed of an operation clock of a first mode may be slower than a speed of an operation clock of a second mode, among power modes.

The foregoing and/or other aspects are achieved by providing a method of reproducing audio data, the method including transferring audio data, and determining a power mode of the audio data based on a memory resource, and an amount of a memory required for reproducing the audio data.

The determining may include adjusting a size of an audio input buffer and a size of an audio output buffer based on the determined power mode.

The determining may include adjusting a speed of an operation clock to be increased or decreased based on the determined power mode.

The method may further include storing, in an audio input buffer, the audio data received from a top system when the determined power mode corresponds to a first mode, controlling a power supplied to the top system based on an amount of audio data stored in the audio input buffer that is consumed, decoding the audio data, and storing the decoded audio data in an audio output buffer.

The controlling may include increasing an amount of time required for powering down the top system in proportion to a size of the audio input buffer.

The controlling may include waking up the top system by re-supplying the power to the top system based on a result of comparing the amount of audio data stored in the audio input buffer that is consumed to a reference amount of input buffer.

The method may further include storing, in an audio input buffer, the audio data received from a top system when the determined power mode corresponds to a second mode, decoding the audio data, storing the decoded audio data in an audio output buffer, and controlling a power supplied to the top system based on at least one of an amount of audio data stored in the audio input buffer that is consumed to the amount of audio data stored in the audio output buffer that is consumed.

The controlling may include increasing an amount of time required for powering down the top system when at least one of a size of the audio output buffer and a speed of an operation clock increases.

The controlling may include powering down the top system by interrupting the power supplied to the top system based on a result of comparing the amount of audio data stored in the audio output buffer that is consumed to a power-down reference amount.

The controlling may include waking up the top system by re-supplying the power to the top system based on a result of comparing the amount of audio data stored in the audio output buffer that is consumed to a wake-up reference amount.

The controlling may include waking up the top system by re-supplying the power to the top system based on a result of comparing the amount of audio data stored in the audio input buffer that is consumed to a reference amount of input buffer.

According to example embodiments, an amount of power consumed may be reduced by temporarily interrupting a power supplied to a module that is not in use when audio or image data is reproduced, among modules constituting an application processor (AP) chip.

The foregoing and/or other aspects are achieved by providing a method of reproducing audio data received from a top system. The method includes storing decoded audio data in an audio output buffer, temporarily powering down the top system when an amount of audio data stored in the audio output buffer reaches a predetermined power-down reference threshold, and restoring power to the top system when the amount of audio data stored in the audio output buffer reaches a predetermined wake-up reference threshold.

In the method, the predetermined power-down reference threshold indicates when the audio output buffer is substantially filled with the decoded audio data and the predetermined wake-up reference threshold indicates when the audio output buffer is substantially empty of decoded audio data.

According to example embodiments, a high flexibility with respect to an audio decoder, a sound post-processing function, and a sound effect may be provided by providing a power mode determined based on a memory resource.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
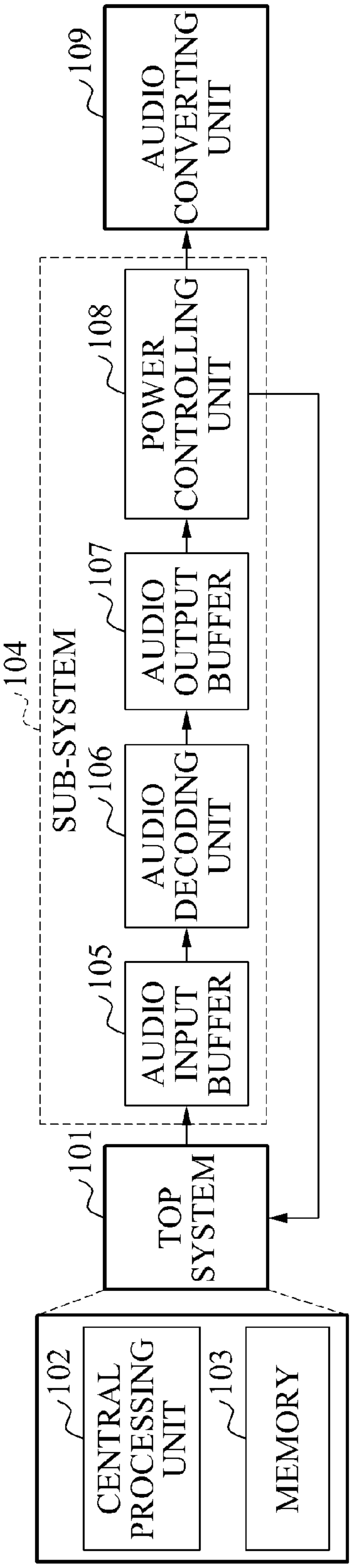
FIG. 1 illustrates a configuration of an apparatus for reproducing audio data according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 includes a block diagram illustrating a configuration of an apparatus 100 for reproducing audio data according to example embodiments.

Referring to FIG. 1, the apparatus may include, for example, a top system 101, a sub-system 104, and an audio converting unit 109.

The top system 101 may transfer audio data to the sub-system 104, and may include, for example, a central processing unit 102 and a memory 103. For example, the top system 101 may transfer, to the sub-system 104, audio data compressed using a predetermined compression codec.

The central processing unit 102 may verify a compression format by analyzing the compressed audio data, and may transfer, to an audio decoding unit 106, audio decoding information indicating the compression format.

The central processing unit 102 may control an overall operation of the apparatus 100, and may manage files and data stored in the memory 103. For example, a Control Process Unit (CPU), or a microcomputer such as a Micom may be used for the central processing unit 102.

The memory 103 may store at least one of compressed audio data, non-compressed audio data, various sound effect information, audio decoding information of compressed audio data, and various audio codecs. The memory 103 may transfer, to an audio input buffer 105, the compressed audio data or the non-compressed audio data. For example, a dynamic random access memory (DRAM) may be used for the memory 103, and the memory 103 may include a code memory, and a data memory.

Here, the sound effect information may correspond to information to strengthen a weak point of a sound reproducing device or to improve a three-dimensional (3D) effect of sound in various audio reproducing devices. For example, the sound effect information may include information about equalization or an equalizer to complement a frequency property, stereo enhancement for providing or strengthening/improving a bass reinforcement effect and the 3D effect, reverberation, channel extension, a stereophonic sound, and the like. In this instance, the sound effect information may be expressed using sound field effect information. The audio decoding information may include a compression format indicating which codec is used for compressing the audio data, among various codecs. For example, the audio decoding information may include Windows Media Audio (WMA), MPEG Audio Layer 3 (MP3), mp3PRO, MP2, Advanced Audio Coding (AAC), OGG, and the like.

The sub-system 104 may be disposed to be within a single package or separate from the top system 101, and may be operated independently. Here, the sub-system 104 may include, for example, the audio input buffer 105, the audio decoding unit 106, an audio output buffer 107, and a power controlling unit 108.

The audio input buffer 105 may store the compressed audio data received from the memory 103.

The audio decoding unit 106 may decode the compressed audio data based on the audio decoding information. For example, when the audio decoding information includes MP3, the audio decoding unit 106 may restore the audio data by decoding the compressed audio data using an MP3 codec. For example, the decoded audio data may correspond to a pulse-code modulation (PCM).

The audio output buffer 107 may store the decoded audio data. In this instance, the audio output buffer 107 and the audio input buffer 105 may be configured into a single buffer, and alternatively may be configured into a plurality of audio output buffers and a plurality of audio input buffers.

For example, when the audio output buffer 107 and the audio input buffer 105 are configured into a single buffer, a portion corresponding to A % of a buffer space constituting the single buffer may be assigned for the audio output buffer 107, and another portion corresponding to B % of the buffer space may be assigned for the audio input buffer 105. Here, A may be greater than B, that is, A>B. In this case, a size of the audio output buffer 107 may be greater than a size of the audio input buffer 105.

The power controlling unit 108 may be disposed between the audio output buffer 107 and the audio converting unit 109, and may control a power supplied to the top system 101 based on at least one of the amount of audio data stored in the audio input buffer 105 that is consumed, and the amount of audio data stored in the audio input buffer 107 that is consumed. Here, the compressed audio data may be stored in the audio input buffer 105, and the decoded audio data may be stored in the audio output buffer 107. That is, the power controlling unit 108 may control the power supplied to the top system 101 based on the amount of compressed audio data that is consumed and an amount of decoded audio data that is consumed.

In this instance, the power controlling unit 108 may increase an amount of time required for powering down the top system 101 when at least one of a size of the audio output buffer 107, and a speed of an operation clock increases. Here, powering down may refer to temporarily interrupting the power supplied to the top system 101.

As an example, the power controlling unit 108 may determine whether to interrupt the power supplied to the top system 101 by comparing the amount of audio data stored in the audio output buffer 107 that is consumed and a predetermined reference amount of power-down, e.g., a predetermined power-down reference amount. For example, in a case in which the power-down reference amount is predetermined to an overall size of the audio output buffer 107, the power controlling unit 108 may determine to interrupt the power supplied to the top system 101 when the amount of audio data stored in the audio output buffer 107 that is consumed becomes identical to the predetermined power-down reference amount. That is, when the audio output buffer 107 is filled with the decoded audio data, the power controlling unit 108 may power down the top system 101 by interrupting the power supplied to the top system 101.

In this instance, after the top system 101 is powered down, the power controlling unit 108 may determine whether to re-supply the power to the top system 101.

As an example, the power controlling unit 108 may determine whether to re-supply the power to the top system 101 by comparing the amount of audio data stored in the audio output buffer 107 that is consumed to a predetermined reference amount of wake-up, e.g., a predetermined wake-up reference amount.

For example, in a case in which the wake-up reference amount is predetermined to 0 or an approximate value of 0, the power controlling unit 108 may determine to re-supply the power to the top system 101 when the audio data stored in the audio output buffer 107 is totally expended. The power controlling unit 108 may wake up the top system 101 by re-supplying the power to the top system 101.

In this instance, when the audio data stored in the audio output buffer 107 is totally expended, the power controlling unit 108 may wake up the memory 103 by re-supplying the power to the memory 103 of the top system 101. That is, the power controlling unit 108 may wake up the memory 103 directly. When only the memory 103 is woken up based on a point in time when the audio data stored in the audio output buffer 107 is totally expended, the sub-system 104 may reproduce audio data using various audio codecs and sound effect information stored in the memory 103 although the size of the audio input buffer 105 and the size of the audio output buffer 107 are both limited.

When the audio data stored in the audio output buffer 107 is totally expended, the power controlling unit 108 may wake up the central processing unit 102 by re-supplying the power to the central processing unit 102. The central processing unit 102 may wake up the memory 103, and the central processing unit may be powered down again. When the memory 103 is woken up by the central processing unit 102, instead of directly by the power controlling unit 108, a system stability of the apparatus 100 may increase.

As another example, the power controlling unit 108 may determine whether to re-supply the power to the top system 101 by comparing the amount of audio data stored in the audio input buffer 105 that is consumed to a predetermined reference amount of input buffer. In this example, the power controlling unit 108 may wake up the top system 101 by re-supplying the power to the top system 101.

For example, in a case of the reference amount of input buffer being set to a predetermined value of 0 or an approximate value of 0, the power controlling unit 108 may determine to re-supply the power to both the central processing unit 102 and the memory 103 when the audio data stored in the audio input buffer 105 is totally expended. The power controlling unit 108 may wake up the central processing unit 102 and the memory 103 by re-supplying the power to the central processing unit 102 and the memory 103.

The audio converting unit 109 may convert the decoded audio data to an audio output signal, and may output the audio output signal. Here, the audio output signal may be in the form of analog data or digital PCM data. For example, the audio converting unit 109 may convert the decoded audio data to an analog signal, and may output the analog signal.

Figure 2:
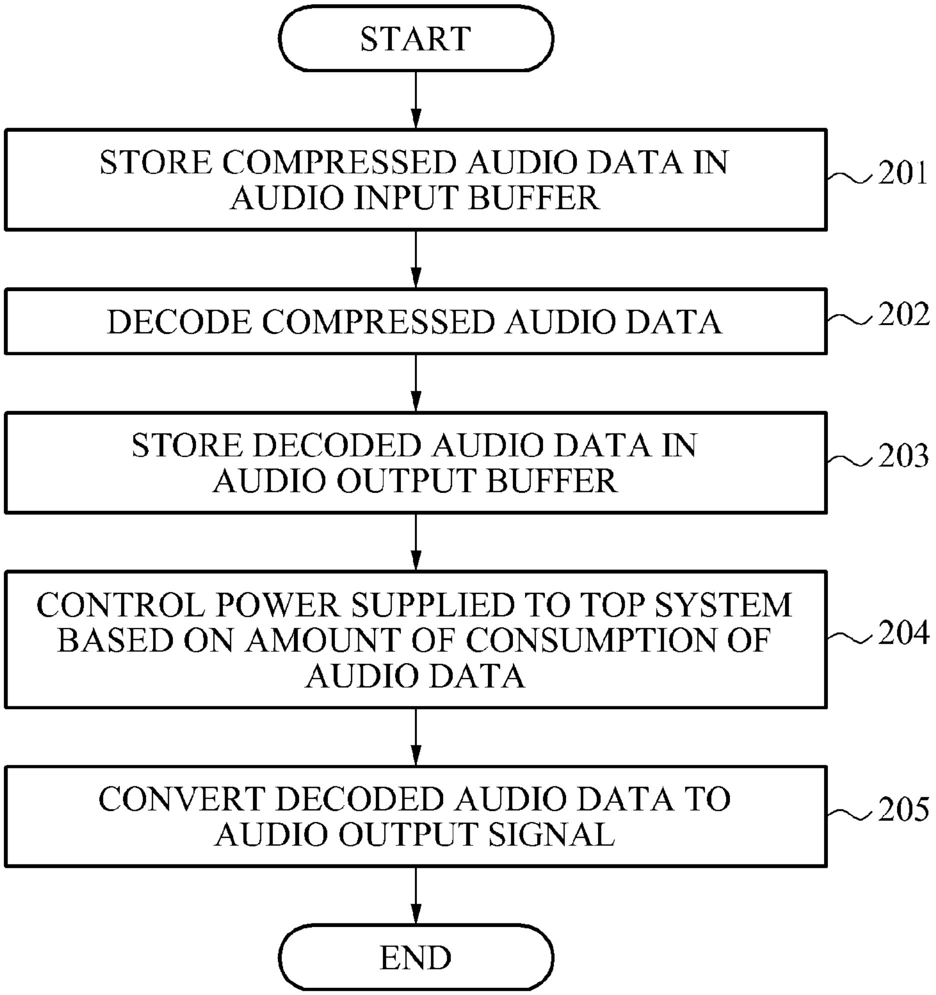
FIG. 2 illustrates an operation of reproducing audio data in the apparatus for reproducing audio data of FIG. 1.

FIG. 2 is a flowchart illustrating an operation of reproducing audio data, such as in the apparatus 100 for reproducing audio data of FIG. 1.

In operation 201, the apparatus 100 may store compressed audio data in an audio input buffer. In this instance, the audio input buffer may receive the compressed audio data from a top system.

In operation 202, the apparatus 100 may decode the compressed audio data. In this instance, the apparatus 100 may decode the compressed audio data based on audio decoding information indicating a compression format of the compressed audio data. The decoded audio data may correspond to PCM data for example.

In operation 203, the apparatus 100 may store the decoded audio data in an audio output buffer. In this instance, a size of the audio output buffer may be greater than a size of the audio input buffer.

In operation 204, the apparatus 100 may control a power supplied to the top system based on at least one of an amount of audio data stored in the audio output buffer that is consumed and an amount of audio data stored in the audio input buffer that is consumed.

In this instance, the apparatus 100 may increase an amount of time required for powering down the top system when at least one of a size of the audio output buffer, and a speed of an operation clock increases. Here, powering down may refer to temporarily interrupting the power supplied to the top system.

In operation 205, the apparatus 100 may convert the decoded audio data to an audio output signal, and may output the audio output signal. For example, the apparatus 100 may convert the decoded audio data to an analog signal, and may output the analog signal.

Hereinafter, a configuration for controlling the power supplied to the top system will be further described with reference to FIG. 3.

Figure 3:
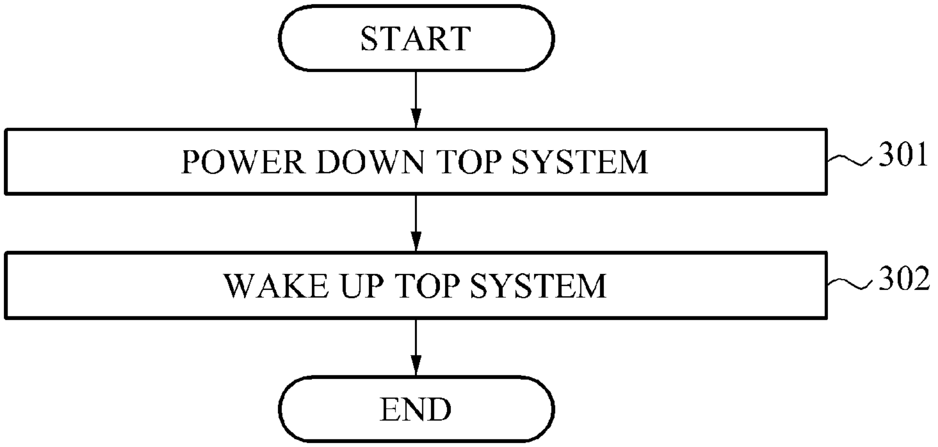
FIG. 3 illustrates an operation of controlling a power supplied to a top system in the apparatus for reproducing audio data of FIG. 1.

FIG. 3 is a flowchart illustrating an operation of controlling a power supplied to a top system in the apparatus 100 for reproducing audio data of FIG. 1.

In operation 301, the apparatus 100 may determine to interrupt the power supplied to the top system by comparing an amount of audio data stored in the audio output buffer that is consumed to a power-down reference amount. That is, the apparatus 100 may power down the top system.

For example, in a case in which the power-down reference amount is predetermined to an overall size of the audio output buffer, the apparatus 100 may power down the top system by interrupting the power supplied to the top system when the audio data stored in the audio output buffer is totally expended.

In operation 302, the apparatus may determine whether to re-supply the power to the top system based on at least one of the amount of audio data stored in the audio output buffer that is consumed, and the amount of audio data stored in the audio input buffer that is consumed. That is, the apparatus 100 may wake up the top system by re-supplying the power to the top system powered down.

As an example, the apparatus 100 may compare the amount of audio data stored in the audio output buffer that is consumed to a predetermined wake-up reference amount. The apparatus 100 may wake up the top system by re-supplying the power to the top system based on a result of the comparison. For example, in a case in which the wake-up reference amount is predetermined to be 0 or an approximate value of 0, the apparatus 100 may wake up the top system when the audio data stored in the audio output buffer is totally expended.

In this instance, the apparatus 100 may wake up a memory of the top system only. Also, the apparatus 100 may wake up a central processing unit of the top system, and may wake up the memory of the top system through the central processing unit. The central processing unit may wake up the memory, and may be powered down again. For example, a DRAM may be used for the memory, and a CPU or a Micom may be used for the central processing unit.

As another example, the apparatus 100 may compare the amount of audio data stored in the audio input buffer that is consumed to a reference amount of input buffer. The apparatus 10 may wake up the top system by re-supplying the power to the top system based on a result of the comparison.

For example, in a case in which the reference amount of input buffer is predetermined to 0 or an approximate value of 0, the apparatus 100 may determine to re-supply the power to the top system when the audio data stored in the audio input buffer is totally expended. The apparatus 100 may wake up the top system by re-supplying the power to the top system.

As previously mentioned, after the top system is powered down, the top system may remain powered down until the audio data stored in the audio output buffer is totally expended. Accordingly, when a size of the audio output buffer becomes greater, an amount of time required for powering down the top system may increase as well, thereby the apparatus 100 may reduce an amount of power consumed.

Also, the apparatus 100 may power down the top system based on an amount of the audio data stored in the audio output buffer, and may wake up the memory of the top system only, thereby operating various audio solutions exceeding a size of an internal memory of a sub-system. Here, the internal memory of the sub-system may include a code memory and a data memory.

In other words, when a code memory used for reproducing sound effect information selected by a user, and an amount of a data memory required exceeds a code memory of the sub-system and a resource of the data memory, or when an audio codec of compressed audio data is not stored in the code memory and the data memory, the apparatus 100 may reproduce the audio data by waking up a memory of a top system to read the sound effect information selected by the user, and the audio codec of the compressed audio data.

Therefore, the apparatus 100 may reproduce the audio data by waking up the memory of the top system only in a state in which a central processing unit of the top system is powered down, thereby providing various audio codecs and sound effect information as well as reducing the power. That is, the apparatus 100 may provide high scalability and flexibility with respect to various audio solutions using low power.

Figure 4:
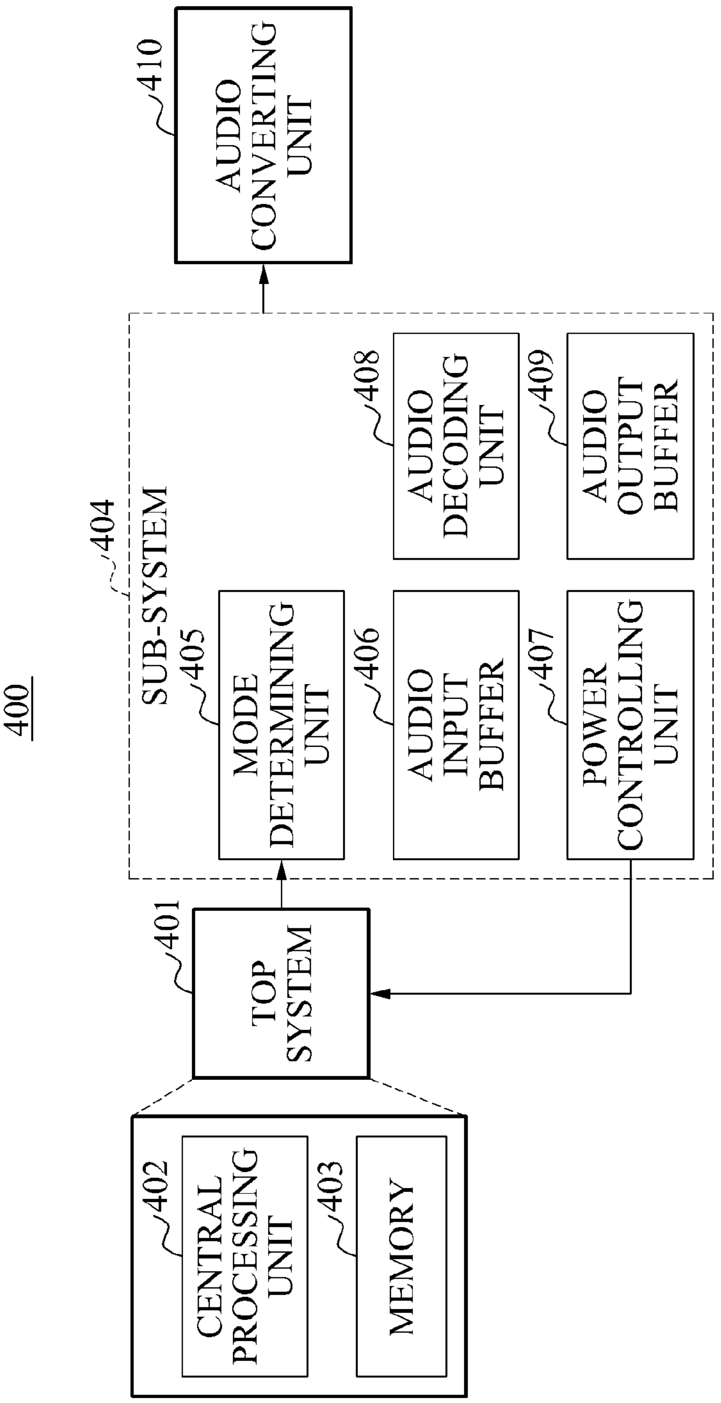
FIG. 4 illustrates a configuration of an apparatus for reproducing audio data according to other example embodiments.

FIG. 4 is a block diagram illustrating a configuration of an apparatus 400 for reproducing audio data according to other example embodiments.

Referring to FIG. 4, the apparatus 400 may include, for example, a top system 401, a sub-system 404, and an audio converting unit 410.

The top system 410 may transfer compressed audio data to the sub-system 404, and may include, for example, a central processing unit 402 and a memory 403. Operations of the central processing unit 402 and the memory 403 of FIG. 4 are similar to the operations of the central processing unit 102 and the memory 103 of FIG. 1 and thus, redundant descriptions will be omitted for conciseness.

The central processing unit 402 may verify a compression format by analyzing the compressed audio data, and may transfer, to an audio decoding unit 408, audio decoding information indicating the compression format.

The central processing unit 402 may control an overall operation of the apparatus 400, and may manage files and data stored in the memory 403. For example, a CPU, or a Micom may be used for the central processing unit 402.

The memory 403 may store at least one of compressed audio data, non-compressed audio data, various sound effect information, audio decoding information of compressed audio data, and various audio codecs. The memory 403 may transfer, to an audio input buffer 406, the compressed audio data or the non-compressed audio data. For example, a DRAM may be used as an external system memory for the memory 403. The memory 403 may include a code memory, and a data memory.

Here, the sound effect information may correspond to information to strengthen a weak point of a sound reproducing device or to improve a three-dimensional (3D) effect of sound in various audio reproducing devices. For example, the sound effect information may include information about equalization or an equalizer to complement a frequency property, stereo enhancement for providing or strengthening/improving a bass reinforcement effect and the 3D effect, reverberation, channel extension, a stereophonic sound, and the like. The audio decoding information may include a compression format indicating which codec is used for compressing the audio data, among various codecs. For example, the audio decoding information may include WMA, MP3, mp3PRO, MP2, AAC, OOG, and the like.

The sub-system 404 may be disposed to be within a single package or separate from the top system 401, and may be operated independently. Here, the sub-system 404 may include, for example, a mode determining unit 405, the audio input buffer 406, a power controlling unit 407, the audio decoding unit 408, and an audio output buffer 409. That is, the apparatus 400 of FIG. 4 may have a configuration similar or identical to the apparatus 100 of FIG. 1, while further including the mode determining unit 405.

The mode determining unit 405 may determine a power mode of the audio data based on a memory resource fixedly allocated to the sub-system 404, and an amount of a memory required for reproducing the audio data. In this instance, the power mode of the audio data may refer to a power mode used to reproduce the audio data, and may include a first mode and a second mode.

Here, the memory resource may refer to an internal memory resource of the sub-system 404, and may include a data memory resource and a code memory resource. The amount of the memory required may include an amount of a data memory and an amount of a code memory of the sub-system 404 required for reproducing the audio data. For example, the amount of the memory required may correspond to a combination of a memory required for decoding the compressed audio data, a memory required for providing sound effect information selected by a user, and a memory required for post-processing of the audio data.

As an example, when the memory resource is greater than the amount of the memory required, the mode determining unit 405 may determine the power mode of the compressed audio data to be the first mode. When the memory resource is less than or equal to the amount of the memory required, the mode determining unit 405 may determine the power mode of the compressed audio data to be the second mode. Here, the first mode may refer to a power mode for controlling a power supplied to the top system 401 based on the amount of audio data stored in the audio input buffer 406 that is consumed, and the second mode may refer to a power mode for controlling the power supplied to the top system 401 based on the amount of audio data stored in the audio output buffer 409 that is consumed.

In this instance, the mode determining unit 405 may adjust a size of the audio input buffer 406 and a size of the audio output buffer 409 based on the determined power mode. For example, when the determined power mode corresponds to the first mode, the mode determining unit 405 may adjust the size of the audio input buffer 406 to be greater than the size of the audio output buffer 409. When the determined power mode corresponds to the second mode, the mode determining unit 405 may adjust the size of the audio output buffer 409 to be greater than the size of the audio input buffer 406.

The mode determining unit 405 may adjust a speed of an operation clock to be increased or decreased based on the determined power mode. For example, when the determined power mode corresponds to the first mode, the mode determining unit 405 may adjust the speed of the operation clock to be identical to a clock speed of the first mode. When the determined power mode corresponds to the second mode, the mode determining unit 405 may adjust the speed of the operation clock to be identical to a clock speed of the second mode. In this instance, the clock speed of the second mode may be predetermined to be faster than the clock speed of the first mode. Accordingly, when a current power mode is determined to be the first mode in a state in which a previous power mode corresponds to the second mode, the mode determining unit 405 may reduce the speed of the operation clock. Similarly, when a current power mode is determined to be the second mode in a state in which a previous power mode corresponds to the first mode, the determining unit 405 may increase the speed of the operation clock. In this instance, when the previous power mode and the current power mode are identical, the mode determining unit 405 may maintain the speed of the operation clock of the previous power mode, rather than adjusting the speed of the operation clock.

When the determined power mode corresponds to the first mode, the audio input buffer 406 may store the compressed audio data received from the top system 401. The power controlling unit 407 may control an amount of power supplied to the top system 401 based on the amount of audio data stored in the audio input buffer 406 that is consumed. The audio decoding unit 408 may decode the compressed audio data. The audio output buffer 409 may store the decoded audio data.

In this instance, when the determined power mode corresponds to the first mode, the power controlling unit 407 may increase an amount of time required for powering down the top system 401 in proportion to the size of the audio input buffer 406.

For example, when the audio input buffer 406 is filled with compressed audio data, the power controlling unit 407 may power down the top system 401 by interrupting the power supplied to the top system 401. When the audio data stored in the audio input buffer 406 is almost totally expended or is totally expended, the power controlling unit 407 may wake up the top system 401 by re-supplying the power to the top system 401. In this instance, the power controlling unit 407 may verify whether the audio data stored in the audio input buffer 406 is totally expended, by comparing the amount of audio data stored in the audio input buffer 406 that is consumed to a predetermined reference amount of input buffer.

Accordingly, when the determined power mode corresponds to the first mode, a time period for powering down the top system 401 may be proportional to the size of the audio input buffer 406. When the size of the audio input buffer 406 increases, the amount of time required for powering down the top system 401 may increase as well, thereby reducing an amount of power expended.

When the determined power mode corresponds to the first mode, a speed of an operation clock of the sub-system 404 may only need to satisfy a speed of an audio output signal output through the audio converting unit 410 and thus, may be predetermined to be relatively low. In this instance, when the sub-system 404 is operated in the first mode, the memory 403 of the top system 401 disposed outside the sub-system 404 may be inaccessible. Accordingly, the amount of the code memory required for reproducing the compressed audio data may be less than the code memory resource fixedly allocated to the sub-system 404, and the amount of the data memory required may be less than the data memory resource fixedly allocated to the sub-system 404. For example, the code memory may correspond to an I-cache, and the data memory may correspond to a static random access memory (SRAM).

When the power mode determined by the mode determining unit 405 corresponds to the second mode, the audio input buffer 406 may store the compressed audio data received from the top system 401. The audio decoding unit 408 may decode the compressed audio data. The audio output buffer 409 may store the decoded audio data. The power controlling unit 407 may control a power supplied to the top system 401 based on at least one of the amount of audio data stored in the audio input buffer 406 that is consumed and the amount of audio data stored in the audio output buffer 409 that is consumed. The audio converting unit 410 may convert the decoded audio data to an audio output signal, and may output the audio output signal.

In this instance, when the determined power mode corresponds to the second mode, the power controlling unit 407 may increase an amount of time required for powering down the top system 401 as at least one of a size of the audio output buffer 409 and a speed of an operation clock increases. For example, a speed of an operation clock of the second mode may be predetermined to be faster than a speed of an operation clock of the first mode. As the speed of the operation clock increases, the audio decoding unit 408 may decode the compressed audio data faster in the second mode than the first mode. In this instance, the audio decoding unit 408 may decode the compressed audio data until the audio output buffer 409 is filled with the decoded audio data.

The power controlling unit 407 may determine whether to interrupt the power supplied to the top system 401 by comparing an amount of audio data stored in the audio output buffer 409 and a predetermined power-down reference amount. The power controlling unit 407 may power down the top system 401 by interrupting the power supplied to the top system 401.

For example, the power controlling unit 407 may power town the top system 401 by interrupting the power supplied to the top system 401 until the decoded audio data stored in the audio output buffer 409 is almost used up or is used up. Accordingly, when the determined power mode corresponds to the second mode, a time period for powering down the top system 401 may be proportional to the size of the audio output buffer 409 and the speed of the operation clock. When the size of the audio output buffer 409 and the speed of the operation clock increase, the time period required for powering down the top system 401 may increase as well, thereby an amount of power consumed by the top system 401 may be reduced.

The power controlling unit 407 may determine whether to re-supply the power to the top system 401 by comparing the amount of audio data stored in the audio output buffer 409 that is consumed to a wake-up reference amount. The power controlling unit 407 may wake up the top system 401 by re-supplying the power to the top system 401.

In FIG. 4, an operation of powering down or waking up the top system 401 by controlling the power supplied to the top system 401 when the determined power mode corresponds to the second mode is identical to an operation of controlling, by the power controlling unit 108 of FIG. 1, the power supplied to the top system 101 of FIG. 1 and thus, redundant descriptions will be omitted for conciseness.

Figure 5:
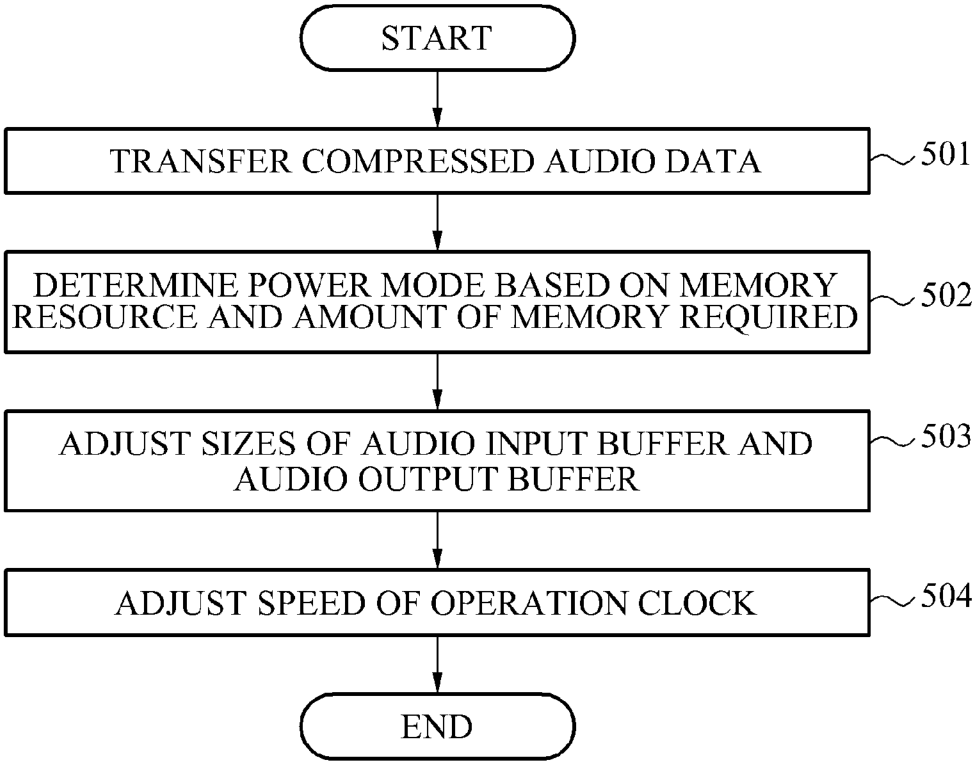
FIG. 5 illustrates an operation of determining a power mode in the apparatus for reproducing audio data of FIG. 4.

FIG. 5 is a flowchart illustrating an operation of determining a power mode in the apparatus 400 for reproducing audio data of FIG. 4.

In operation 501, the apparatus 400 may transfer compressed audio data to an audio input buffer of a sub-system. For example, the audio input buffer may store the compressed audio data received from a memory of a top system.

In operation 502, the apparatus 400 may determine a power mode of the compressed audio data based on a memory resource and an amount of a memory required for reproducing the compressed audio data.

Here, the memory resource may refer to an internal memory resource of the sub-system, and may include a data memory resource and a code memory resource. The amount of the memory required may include an amount of a data memory and an amount of a code memory of the sub-system required for reproducing the audio data. For example, the amount of the memory required may correspond to a combination of a memory required for decoding the compressed audio data, a memory required for providing sound effect information selected by a user, and a memory required for post-processing the audio data.

In operation 503, the apparatus 400 may adjust a size of the audio input buffer and a size of an audio output buffer based on the determined power mode.

For example, when the determined power mode corresponds to a first mode, the apparatus 400 may adjust the size of the audio input buffer to be greater than the size of the audio output buffer. When the determined power mode corresponds to a second mode, the apparatus 400 may adjust the size of the audio output buffer to be greater than the size of the audio input buffer.

In operation 504, the apparatus 400 may adjust a speed of an operation clock based on the determined power mode.

For example, a speed of an operation clock of the first mode and a speed of an operation clock of the second mode may be predetermined, and the speed of the operation clock of the first mode may be slower than the speed of the operation clock of the second mode. When a current power mode is determined to be the first mode in a state in which a previous power mode corresponds to the second mode, the apparatus 400 may reduce the speed of the operation clock until the speed of the operation clock matches the speed of the operation clock of the first mode. When a current power mode is determined to be the second mode in a state in which a previous power mode corresponds to the first mode, the apparatus 400 may increase the speed of the operation clock until the speed of the operation clock matches the speed of the operation clock of the second mode.

In the foregoing it is described, as an example embodiment, that the apparatus 400 may sequentially perform operation 503 of adjusting the size of the audio input buffer and the size of the audio output buffer, and operation 504 of adjusting the speed of the operation clock. The apparatus 400: 1) may adjust the speed of the operation clock, and then the size of the audio input buffer and the size of the audio output buffer, based on the determined power mode, or; 2) may perform the operation of adjusting the speed of the operation clock, and the operation of adjusting the size of the audio input buffer and the size of the audio output buffer, simultaneously. Also, the apparatus 400 may perform only one of the operation of adjusting the size of the audio input buffer and the size of the audio output buffer, and the operation of adjusting the speed of the operation clock, based on the determined power mode.

Figure 6:
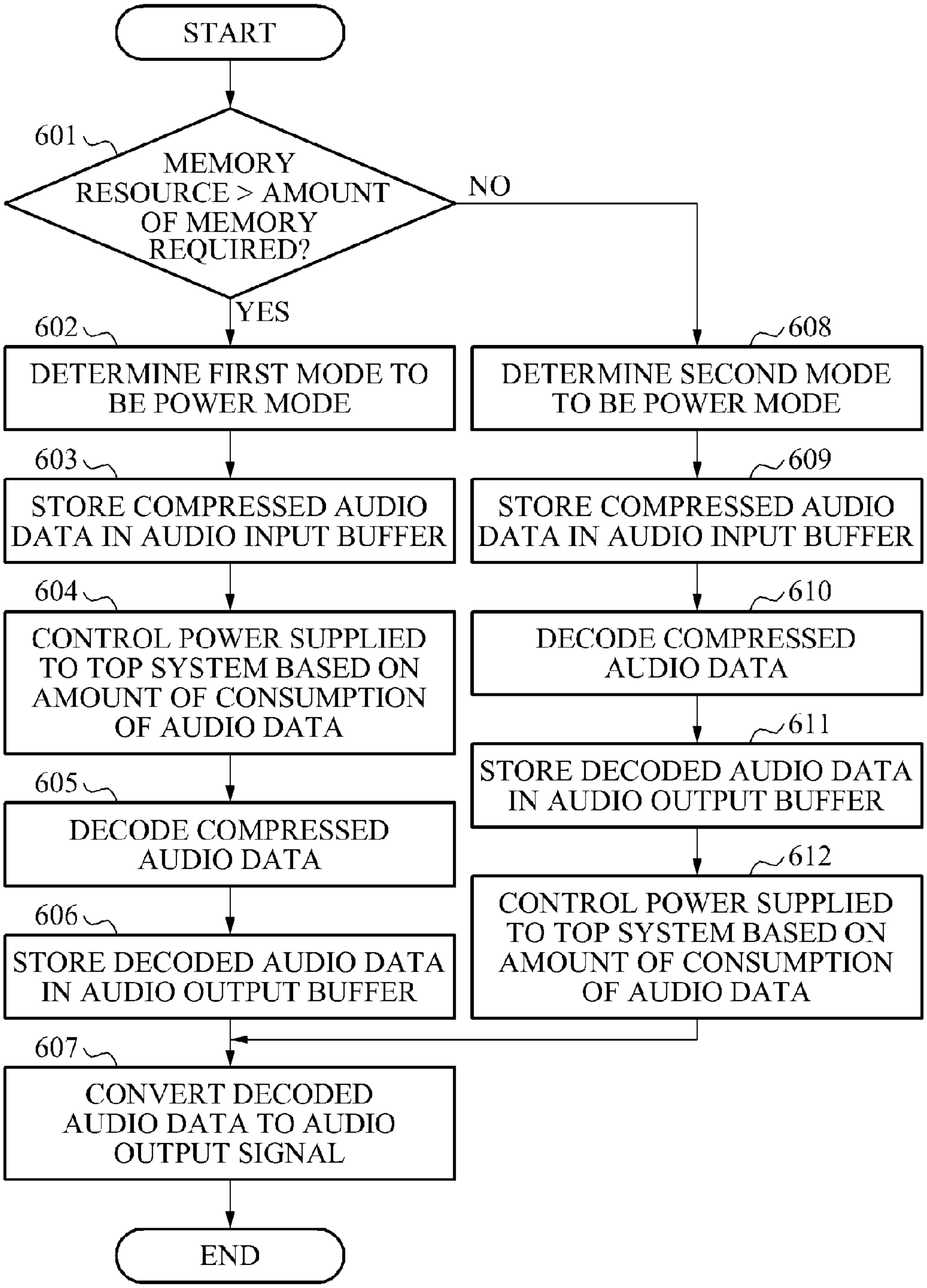
FIG. 6 illustrates an operation of controlling a power supplied to a top system in the apparatus for reproducing audio data of FIG. 4.

FIG. 6 is a flowchart illustrating an operation of controlling a power supplied to a top system in the apparatus 400 for reproducing audio data of FIG. 4.

In FIG. 6, an operation of controlling the power supplied to the top system when a determined power mode corresponds to a second mode is identical to an operation of controlling, by the apparatus 100 of FIG. 2, the power supplied to the top system and thus, redundant descriptions will be omitted for conciseness.

In operation 601, the apparatus 400 may determine a power mode of compressed audio data by comparing a memory resource and an amount of a memory required.

When the memory resource is greater than the amount of the memory required, the apparatus 400 may determine the power mode to be a first mode, in operation 602. Here, the first mode may refer to a power mode for controlling the power supplied to the top system based on the amount of audio data stored in the audio input buffer that is consumed.

In operation 603, the apparatus 400 may store the compressed audio data in the audio input buffer.

In operation 604, the apparatus 400 may control the power supplied to the top system based on the amount of audio data stored in the audio input buffer that is consumed.

In this instance, the apparatus 400 may increase an amount of time required for powering down the top system in proportion to a size of the audio input buffer. For example, when the audio input buffer is filled with the compressed audio data, the apparatus 400 may power down the top system by interrupting the power supplied to the top system. Accordingly, in a case of the first mode, when the size of the audio input buffer increases, the amount of time required for powering down the top system may increase as well, thereby an amount of power expended may be reduced.

The apparatus 400 may wake up the top system by re-supplying the power to the top system powered down. In this instance, the apparatus 400 may re-supply the power to the top system by comparing the amount of audio data stored in the audio input buffer that is consumed to a reference amount of input buffer.

For example, in a case in which the reference amount of the input buffer is predetermined to 0 or an approximate value of 0, the apparatus 400 may wake up the top system by re-supplying the power to the top system when the audio data stored in the audio input buffer is almost totally expended or is totally expended.

In operation 605, the apparatus 400 may decode the compressed audio data based on audio decoding information.

In operation 606, the apparatus 400 may store the decoded audio data in an audio output buffer. In this instance, in a case of the first mode, a size of the audio input buffer may be greater than a size of the audio output buffer.

In operation 607, the apparatus 400 may convert the decoded audio data to an audio output signal.

When the memory resource is less than or equal to the amount of the memory required in operation 601, the apparatus 400 may determine the power mode to be a second mode in operation 608. Here, the second mode may refer to a power mode for controlling the power supplied to the top system based on an amount of audio data stored in the audio output buffer that is consumed.

In operation 609, the apparatus 400 may store compressed audio data in an audio input buffer.

In operation 610, the apparatus 400 may decode the compressed audio data based on decoding information.

In operation 611, the apparatus 400 may store the decoded audio data in the audio output buffer. In this instance, in a case of the second mode, a size of the audio output buffer may be greater than a size of the audio input buffer.

In operation 612, the apparatus 400 may control the power supplied to the top system based on at least one of an amount of audio data stored in the audio input buffer that is consumed and an amount of audio data stored in the audio output buffer that is consumed.

In this instance, the apparatus 400 may interrupt the power supplied to the top system by comparing the amount of audio data stored in the audio output buffer that is consumed to a power-down reference amount.

For example, in a case in which the power-down reference amount is predetermined to a size of the audio output buffer, the apparatus 400 may power down the top system by interrupting the power supplied to the top system when the audio output buffer is filled with the decoded audio data. In this instance, as the speed of the operation clock becomes faster, the apparatus 400 may decode the compressed audio data faster. Accordingly, as at least one of the size of the audio output buffer and the speed of the operation clock increases, the apparatus 400 may increase the amount of time required for powering down the top system.

The apparatus 400 may wake up the top system by re-supplying the power to the top system.

As an example, the apparatus 400 may re-supply the power to the top system by comparing the amount of audio data stored in the audio output buffer that is consumed to a wake-up reference amount. For example, in a case in which the wake-up reference amount is predetermined to 0 or an approximate value of 0, the apparatus 400 may wake up the top system by re-supplying the power to the top system when the decoded audio data stored in the audio output buffer is almost totally expended or totally expended.

As another example, the apparatus 400 may re-supply the power to the top system by comparing the amount of audio data stored in the audio input buffer that is consumed to a reference amount of input buffer. For example, in a case in which the reference amount of input buffer is predetermined to 0 or an approximate value of 0, the apparatus 400 may wake up the top system by re-supplying the power to top system when the compressed audio data stored in the audio input buffer is almost totally expended or totally expended.

In a case of the second mode, the apparatus 400 may convert the decoded audio data to an audio output signal, and may output the audio output signal, in operation 607. For example, the apparatus 400 may convert a PCM data to an analog signal, and may output the analog signal.

As described in the foregoing with reference to FIGS. 5 and 6, the apparatus 400 may selectively provide a power mode by comparing a memory resource fixedly allocated to a sub-system and an amount of a memory required for reproducing compressed audio data. In particular, when the memory resource is greater than the amount of the memory required, the apparatus 400 may reproduce the audio data by controlling a power supplied to a top system based on a first mode, thereby reducing a greater amount of power consumed in the first mode, compared to a second mode.

When the memory resource is less than or equal to the amount of the memory required, the apparatus 400 may reproduce the audio data by controlling the power supplied to the top system based on the second mode, thereby providing various audio solutions while reducing an amount of power expended. That is, in a case of the second mode, the apparatus 400 may wake up only a memory of the top system while powering down a central processing unit of the top system. Accordingly, although a size of an internal memory corresponding to the memory resource of the sub-system is less than the amount of the memory required for reproducing the compressed audio data, the apparatus 400 may reproduce, through the memory of the top system, the compressed audio data using various pieces of sound effect information, an equalizer, and various audio codecs.

The methods according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Any one or more of the software modules described herein may be executed by a dedicated processor unique to that unit or by a processor common to one or more of the modules. The described methods may be executed on a general purpose computer or processor or may be executed on a particular machine such as the apparatus for reproducing audio data described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for reproducing audio data, the apparatus comprising:
- a top system to transfer compressed audio data and comprise a central processing unit (CPU); and
- a subsystem, distinct from the top system, to receive the compressed audio data, and
- wherein, the subsystem comprises:
  - an audio input buffer to store the compressed audio data;
  - an audio decoding unit to decode the compressed audio data;
  - an audio output buffer to store the decoded audio data;
  - a mode determining unit to determine a power mode of the top system between a first mode corresponding to the audio input buffer and a second mode corresponding to the audio output buffer based on a memory resource of the subsystem and an amount of a memory required for reproducing an audio data; and
  - a power controlling unit to control a power supplied to the top system based on at least one of an amount of audio data stored in the audio input buffer that is consumed and the amount of audio data stored in the audio output buffer that is consumed when the determined power mode corresponds to the second mode,
  - wherein the mode determining unit adjusts a size of the audio input buffer and a size of the audio output buffer based on the determined power mode, and
  - wherein when the determined power mode corresponds to the first mode, the mode determining unit adjusts the size of the audio input buffer to be greater than the size of the audio output buffer, and when the determined power mode corresponds to the second mode, the mode determining unit adjusts the size of the audio output buffer to be greater than the size of the audio input buffer.

2. The apparatus of claim 1, wherein the mode determining unit adjusts a speed of an operation clock to be increased or decreased based on the determined power mode.

3. The apparatus of claim 1, wherein the power controlling unit is configured to control the power supplied to the top system based on the amount of audio data stored in the audio input buffer that is consumed when the determined power mode corresponds to the first mode.

4. The apparatus of claim 3, wherein the power controlling unit increases an amount of time in which the top system is temporarily powered down in proportion to the size of the audio input buffer.

5. The apparatus of claim 3, wherein the controlling unit wakes up the top system by re-supplying the power to the top system based on a result of comparing the amount of audio data stored in the audio input buffer that is consumed to a reference amount of input buffer.

6. The apparatus of claim 1, wherein the power controlling unit increases an amount of time in which the top system is temporarily powered down when at least one of the size of the audio output buffer and a speed of an operation clock increases.

7. The apparatus of claim 1, wherein the power controlling unit powers down the top system by interrupting the power supplied to the top system based on a result of comparing the amount of audio data stored in the audio output buffer that is consumed to a power-down reference amount.

8. The apparatus of claim 1, wherein the power controlling unit wakes up the top system by re-supplying the power to the top system based on a result of comparing the amount of audio data stored in the audio output buffer that is consumed to a wake-up reference amount.

9. The apparatus of claim 1, wherein the power controlling unit wakes up the top system by re-supplying the power to the top system based on a result of comparing the amount of audio data stored in the audio input buffer that is consumed to a reference amount of input buffer.

10. The apparatus of claim 1, wherein a speed of an operation clock of the first mode is slower than a speed of an operation clock of the second mode, among power modes.

11. A method of reproducing audio data, the method comprising:

receiving compressed audio data from a separately provided top system including a central processing unit (CPU), and storing the compressed audio data in an audio input buffer;

decoding the compressed audio data using an audio decoding unit, and storing the decoded audio data in an audio output buffer; and determining a power mode of the compressed audio data top system between a first mode corresponding to the audio input buffer and a second mode corresponding to the audio output buffer based on a memory resource of subsystem and an amount of a memory required for reproducing an audio data, and;

controlling a power supplied to the top system based on at least one of an amount of audio data stored in the audio input buffer that is consumed and the amount of audio data stored in the audio output buffer that is consumed when the determined power mode corresponds to the second mode, wherein the subsystem comprises the audio input buffer, the audio decoding unit, and the audio output buffer, and is distinct from the top system, wherein the determining comprises adjusting a size of the audio input buffer and a size of the audio output buffer based on the determined power mode, and wherein when the determined power mode corresponds to the first mode, the size of the audio input buffer is adjusted to be greater than the size of the audio output buffer, and when the determined power mode corresponds to the second mode, the size of the audio output buffer is adjusted to be greater than the size of the audio input buffer.

12. The method of claim 11, wherein the determining comprises adjusting a speed of an operation clock to be increased or decreased based on the determined power mode.

13. The method of claim 11, further comprising:

controlling the power supplied to the top system based on the amount of audio data stored in the audio input buffer that is consumed when the determined power mode corresponds to the first mode.

14. The method of claim 13, wherein the controlling comprises increasing an amount of time in which the top system is temporarily powered down in proportion to the size of the audio input buffer.

15. The method of claim 13, wherein the controlling comprises waking up the top system by re-supplying the power to the top system based on a result of comparing the amount of audio data stored in the audio input buffer that is consumed to a reference amount of input buffer.

16. The method of claim 11, wherein the controlling comprises increasing an amount of time in which the top system is temporarily powered down when at least one of the size of the audio output buffer and a speed of an operation clock increases.

17. The method of claim 11, wherein the controlling comprises powering down the top system by interrupting the power supplied to the top system based on a result of comparing the amount of audio data stored in the audio output buffer that is consumed to a power-down reference amount.

18. The method of claim 11, wherein the controlling comprises waking up the top system by re-supplying the power to the top system based on a result of comparing the amount of audio data stored in the audio output buffer that is consumed to a wake-up reference amount.

19. The method of claim 11, wherein the controlling comprises waking up the top system by re-supplying the power to the top system based on a result of comparing the amount of audio data stored in the audio input buffer that is consumed to a reference amount of input buffer.

20. The method of claim 11, wherein a speed of an operation clock of the first mode is slower than a speed of an operation clock of the second mode, among power modes.

* * * * *